(12) United States Patent
Perkins

(10) Patent No.: US 11,691,570 B2
(45) Date of Patent: Jul. 4, 2023

(54) TELESCOPING ROOF RACK SYSTEM

(71) Applicant: William J. Perkins, Leadville, CO (US)

(72) Inventor: William J. Perkins, Leadville, CO (US)

(*) Notice: Subject to any disclaimer, the term of this patent is extended or adjusted under 35 U.S.C. 154(b) by 0 days.

(21) Appl. No.: 17/375,432

(22) Filed: Jul. 14, 2021

(65) Prior Publication Data
US 2022/0017018 A1 Jan. 20, 2022

Related U.S. Application Data

(60) Provisional application No. 63/051,473, filed on Jul. 14, 2020.

(51) Int. Cl.
B60R 9/04 (2006.01)
B60R 9/045 (2006.01)

(52) U.S. Cl.
CPC .................................. B60R 9/045 (2013.01)

(58) Field of Classification Search
CPC ............ B60R 9/04; B60R 9/045; B60R 9/052
USPC ........................................................ 224/320
See application file for complete search history.

(56) References Cited

U.S. PATENT DOCUMENTS

| 1,316,609 | A | * | 9/1919 | Wuensch | E21B 6/06 |
| | | | | | 279/19.5 |
| 2,909,399 | A | * | 10/1959 | Wasson | A47B 5/06 |
| | | | | | 297/147 |
| 3,192,937 | A | * | 7/1965 | Carter | E04H 15/06 |
| | | | | | 135/904 |
| 3,299,989 | A | * | 1/1967 | Santosuosso | B60P 7/12 |
| | | | | | 410/49 |
| 3,952,758 | A | * | 4/1976 | Addison | E04F 10/0603 |
| | | | | | 135/141 |
| 3,995,565 | A | * | 12/1976 | Kersey | B60P 7/14 |
| | | | | | 182/201 |
| 4,457,553 | A | | 7/1984 | Larkin | |
| 4,782,541 | A | * | 11/1988 | Tuchman | A47C 31/002 |
| | | | | | 403/166 |
| 5,449,032 | A | | 9/1995 | Blevins | |
| D403,782 | S | * | 1/1999 | James | D25/61 |
| 6,398,673 | B1 | * | 6/2002 | Maruca | A63B 21/1627 |
| | | | | | 482/40 |
| 6,811,207 | B2 | | 11/2004 | Dalpizzol | |
| 6,959,643 | B1 | * | 11/2005 | Sammons | B30B 9/3057 |
| | | | | | 100/231 |
| 8,662,563 | B1 | | 3/2014 | Hardenbrook | |

(Continued)

FOREIGN PATENT DOCUMENTS

CN 110259260 9/2019
GB 926369 5/1963

(Continued)

Primary Examiner — Peter N Helvey
(74) Attorney, Agent, or Firm — Leyendecker & Lemire, LLC

(57) ABSTRACT

A telescoping roof rack system is described. Embodiments of the telescoping roof rack system can include, but are not limited to, roof rack assemblies, crossbar assemblies, a canopy, and combinations thereof. The telescoping roof rack system can be implemented to provide an awning proximate a side of a vehicle. The telescoping roof rack system can provide protrusions extending out an end of the crossbar assemblies such that no additional components are needed to provide the awning.

20 Claims, 8 Drawing Sheets

(56) References Cited

U.S. PATENT DOCUMENTS

| | | | |
|---|---|---|---|
| 8,820,717 B2 | 9/2014 | Shrader | |
| 8,876,189 B1 | 11/2014 | Williams | |
| 9,139,258 B2 | 9/2015 | Russikoff | |
| 9,580,928 B1* | 2/2017 | Currid | E04H 15/06 |
| 9,739,072 B1 | 8/2017 | Melland | |
| 10,256,589 B2 | 4/2019 | Russikoff | |
| 10,427,756 B2 | 10/2019 | De Waal | |
| 10,808,416 B2* | 10/2020 | Park | E04H 15/06 |
| 11,384,560 B2* | 7/2022 | Pearson | E04H 15/642 |
| 2008/0135508 A1 | 6/2008 | Fogolin | |
| 2009/0231231 A1* | 9/2009 | Norman | H04B 1/3838 |
| | | | 343/883 |
| 2012/0068036 A1* | 3/2012 | Cerezo Lotina | E04G 21/26 |
| | | | 248/354.1 |
| 2017/0144609 A1* | 5/2017 | Poudrier | B60R 9/045 |
| 2020/0062188 A1* | 2/2020 | Boyle | B60R 9/045 |
| 2021/0039560 A1* | 2/2021 | Malgeri | B60R 9/048 |

FOREIGN PATENT DOCUMENTS

| | | |
|---|---|---|
| GB | 1117932 | 6/1968 |
| GB | 1279318 | 6/1972 |
| KR | 1020020021239 | 3/2002 |
| KR | 101461613 | 11/2014 |
| KR | 101541726 | 7/2015 |
| WO | 2013173439 | 11/2013 |
| WO | 2018229452 | 12/2018 |

* cited by examiner

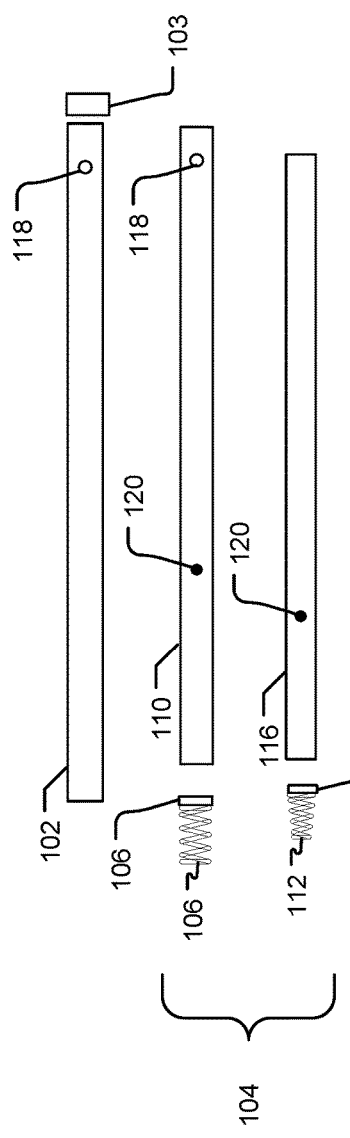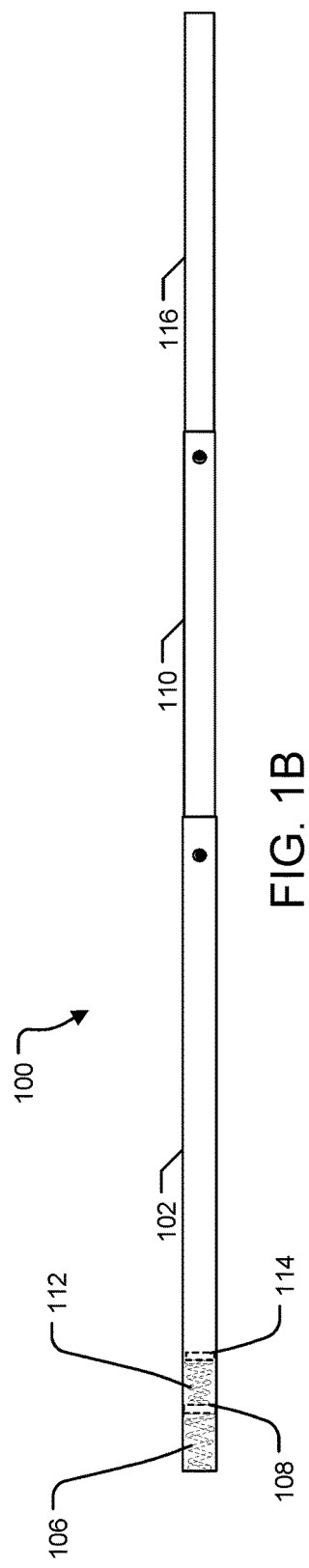
FIG. 1A
FIG. 1B
FIG. 1C

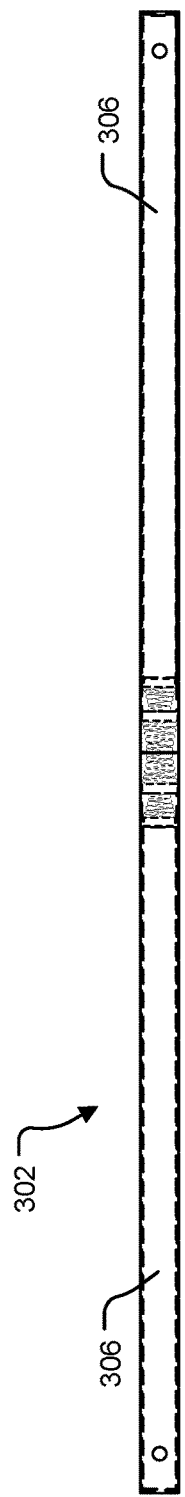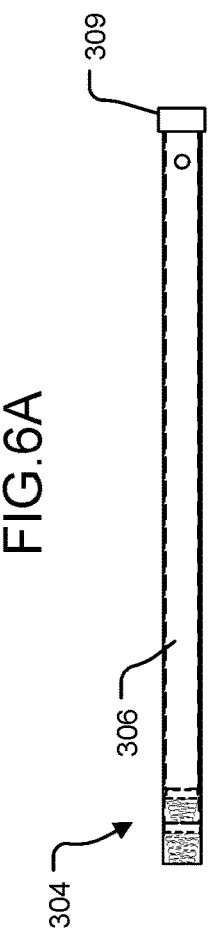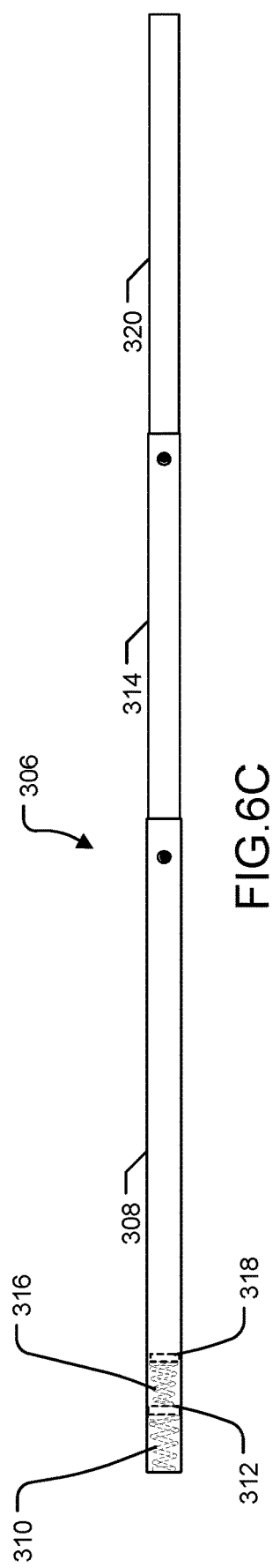
FIG.6A
FIG.6B
FIG.6C

TELESCOPING ROOF RACK SYSTEM

CROSS-REFERENCE TO RELATED APPLICATION

This application claims the benefit of U.S. Provisional Application No. 63/051,473, filed Jul. 14, 2020.

BACKGROUND

Vehicles are equipped with roof racks and various add-ons that allow people to store gear on a rooftop of their vehicle. For instance, bike racks, cargo boxes, ski racks, kayak racks, etc. are available to allow people to store said gear on their vehicle rooftop. Other add-ons that attach to a roof racks include showers, awnings, tents, etc. However, the larger add-ons (e.g., cargo boxes) generally only allow for a single accessory to be attached to the roof rack. This limits the amount of add-ons that can be used while implementing the roof rack.

When using a vehicle for camping (or similar activities), people take their vehicles to locations where protection from sun, rain, and snow is often needed. In outdoor environments, awnings or canopies are typically assembled and secured to the vehicle to protect users from the elements. However, these awnings are typically attached to a roof rack similar to other roof rack accessories which takes up valuable space on the roof rack. Further, some awnings include support legs that must be setup to use the awning.

As such, there is a need for a retractable awning system that does not take up space on crossbars of a roof rack to allow for other accessories to be secured to the crossbars.

BRIEF DESCRIPTION OF THE DRAWINGS

FIG. 1A is an exploded side view of a crossbar assembly according to one embodiment of the present invention.

FIG. 1B is a side view of a crossbar assembly in an extended configuration according to one embodiment of the present invention.

FIG. 1C is a side view of a crossbar assembly in a retracted configuration according to one embodiment of the present invention.

FIG. 6A is a side view of a roof rack assembly according to one embodiment of the present invention.

FIG. 6B is a side view of a crossbar assembly according to one embodiment of the present invention.

FIG. 6C is a side view of a crossbar assembly in an extended configuration according to one embodiment of the present invention.

DETAILED DESCRIPTION

Figure 2:
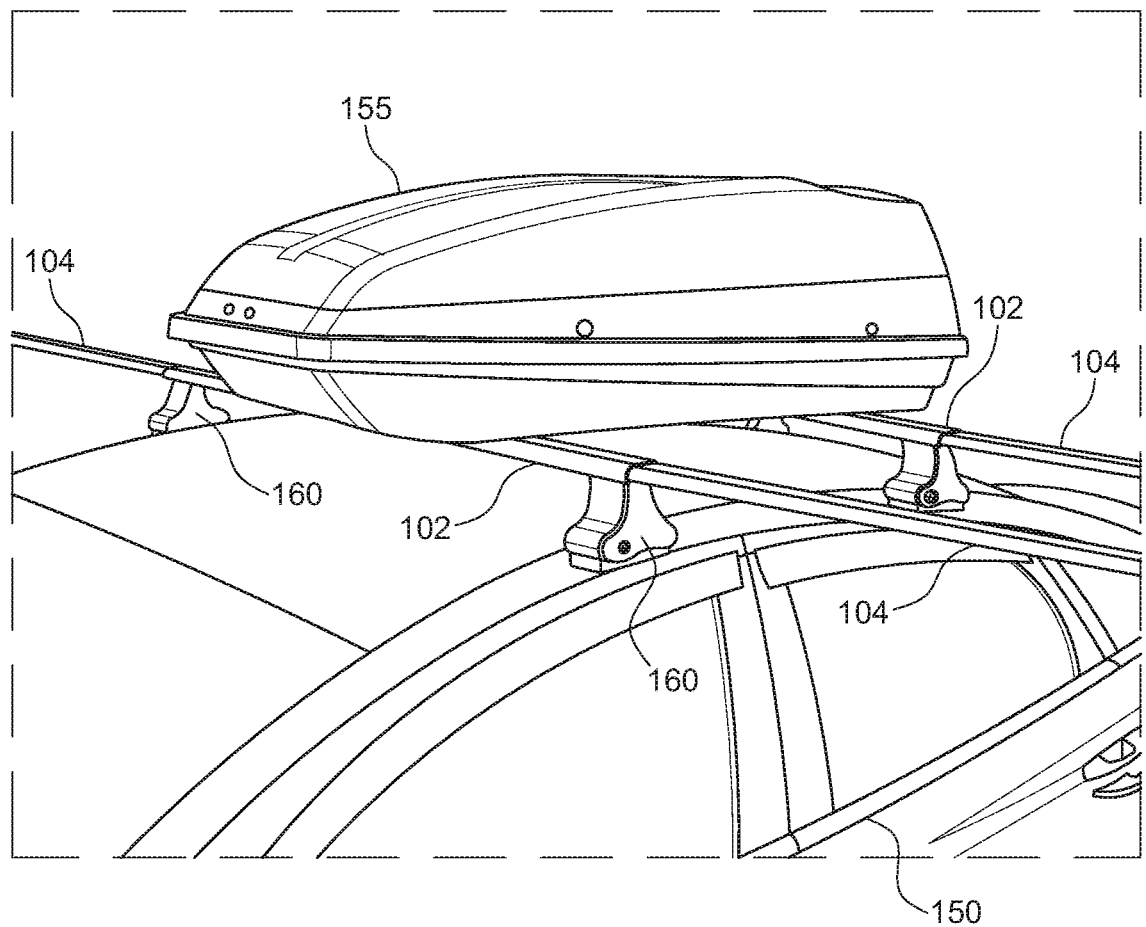
FIG. 2 is a perspective view of a pair of crossbar assemblies attached to a vehicle according to one embodiment of the present invention.

Embodiments of the present invention include a telescoping roof rack system. The telescoping roof rack system can include, but is not limited to, one or more telescoping crossbar assemblies, a pair of telescoping roof rack assemblies, and combinations thereof. Embodiments are contemplated where the telescoping crossbar assemblies are implemented with an existing roof rack. Embodiments are further contemplated where the telescoping roof rack assemblies are used with currently available crossbars. The telescoping roof rack assemblies and the telescoping crossbar assemblies can each include telescoping assemblies configured to extend out from an end of said member. As can be appreciated, the telescoping assemblies of the roof rack assemblies can extend fore and aft of a vehicle and the telescoping assemblies of the crossbar assemblies can extend out from either side of a vehicle. Of note, although the telescoping roof rack system is described being used with a vehicle, the system can be implemented with automobile related trailers, recreational vehicles, campers, etc.

In one embodiment, the telescoping roof rack system can include the telescoping roof rack assemblies coupled to a roof of a vehicle. The telescoping crossbar assemblies can be coupled to the telescoping roof rack assemblies. Of note, the telescoping crossbar assemblies can be implemented similar to currently available crossbars in addition to providing protrusions that are configured to extend and retract from housings of the telescoping crossbar assemblies. The telescoping crossbar assemblies can be load bearing similar to currently available crossbars to receive accessories thereon. In such an embodiment, the telescoping roof rack system can provide protrusions extending forwards, backwards, and out from both sides of the vehicle. One or more accessories can be provided that can removably attach to the extended protrusions. For example, a canopy can be provided to removable attach between two parallel protrusions to make an awning. In another example, a sheet can be hung down from a single extended protrusion to provide a privacy curtain. In yet another example, a single protrusion can be implemented as a drying rack for clothes, swimsuits, towels, etc. It is to be appreciated that the telescoping assemblies of the crossbars and roof rack can be used in combination or independent of one another.

In another embodiment, the telescoping roof rack system can include the telescoping roof rack assemblies coupled to a roof of a vehicle. Currently available crossbars can be secured to the telescoping roof rack assemblies. In such an embodiment, the telescoping roof rack system can provide protrusions extending forwards and backwards of the vehicle. The crossbars can be implemented as intended.

In yet another embodiment, the telescoping roof rack system can include the telescoping crossbar assemblies coupled to an existing roof rack. The telescoping crossbar assemblies can be configured to be coupled to a variety of different roof racks. Once secured to the roof rack, the telescoping crossbar assemblies can be implemented substantially similar to currently available crossbars. In such an embodiment, the telescoping roof rack system can provide protrusions extending out from both sides (or one side) of the vehicle.

Typically, the telescoping crossbar assemblies can be used in place of currently available roof rack crossbars. The telescoping crossbar assemblies can be implemented substantially similar to currently available crossbars in addition to being able to provide horizontal supports extending out past a side of a vehicle. For example, the telescoping crossbar assemblies can be outfitted with a ski rack for carrying skis similar to currently available roof rack crossbars. In another example, a cargo box can be secured to the telescoping crossbar assemblies similar to how they are currently secured to roof rack crossbars.

In one embodiment, the telescoping crossbar assembly can include, but is not limited to, a housing and a telescoping assembly. The housing can include an end stop (or cap) and a means for being secured to a roof rack. The telescoping assembly can include, but is not limited to, a first spring, a first stop, a first telescoping member, a second stop, a second spring, and a second telescoping member. Embodiments can further include a third spring, a third stop, and a third telescoping member. The housings can be manufactured to be load bearing similar to currently available crossbars. The components of the telescoping assembly, when extended, can be structurally sufficient to receive a load thereon. In contrast to currently available automobile awnings, the telescoping crossbar assembly does not require vertical rods to support distal ends of the telescoping assemblies.

Typically, the housing and each of the telescoping members can include one or more spring buttons and holes for receiving spring buttons therein. For instance, the housing can include a hole to receive a spring button from the first telescoping member. The first telescoping member can include a hole to receive a spring button from the second telescoping member. As can be appreciated, the holes and spring buttons can ensure the telescoping members do not proceed to far. Of note, other means for securing the telescoping assembly components in place are contemplated and not outside a scope of the current disclosure.

Each of the components can fit into the housing with the end cap providing a cover for an open end of the housing. In some instances, the housing and telescoping members can have the same general shape. In other instances, the housing can have a different shape than the telescoping members. For instance, the housing may have an aerofoil shape while the telescoping members have a circular tube shape.

Generally, a first end of the housing can be closed and a second end can be open to receive the other components therein. Although a tube is shown, it is to be appreciated that other shapes for the housing are contemplated. For instance, a tear drop shape (or aerofoil shape) may be implemented to provide an aerodynamic profile. The first spring and the first stop can be inserted into the open end of the housing before the first telescoping member is inserted. The second spring, second stop, and the second telescoping member may then each be inserted into the first telescoping member. As can be appreciated, the second spring can be located between the first stop and the second stop and the second telescoping member can interface with the second stop. In embodiments implementing a third telescoping member, a third stop, a third spring, and the third telescoping member can be inserted into the second telescoping member. The third spring can be located between the second stop and the third stop. The third telescoping member can interface with the third stop. Of note, the first stop, the second stop, and the third stop may be integrally formed as part of the springs. In another instance, the telescoping members can be adapted to interface directly with the springs such that the springs do not pass through at least one end of the telescoping members.

Of note, to fully insert the first telescoping member and the second telescoping member into the housing, the springs need to be compressed. After the telescoping members have been inserted fully into the housing, the end cap can be secured to the open end of the housing to keep the telescoping members from moving. As can be appreciated, by compressing the springs when inserting the telescoping members, the springs can constantly push the telescoping members and thus limit an amount of movement of the telescoping members when stored for traveling.

The end cap can be secured to an end of the housing. When the telescoping assembly is inserted into the housing and the cap is secured to an end of the housing, this configuration can typically be implemented when a user is ready to move their vehicle. For example, this can be a storage configuration. In one example embodiment, a cotter pin and rod combination can be used to secure the end cap to the housing. It is to be appreciated that other means of securing the end cap to the housing are contemplated. In one instance, the end cap may be friction fit to the end of the housing. In another instance, the end cap may be threadably coupled to the housing. As previously mentioned, the end cap can be implemented to keep the telescoping assembly inserted into the housing.

The first telescoping member and the second telescoping member can each partially extend out due to the springs located inside the housing. Of note, when the end cap is removed from the end of the housing, the compression on the springs can be released and the springs can push the first telescoping member and the second telescoping members out. Typically, a user can first pull the second telescoping member out until the spring button of the second telescoping member engages a hole of the first telescoping member. Next, a user can then pull the first telescoping member out until the spring button engages a hole in the housing. In one instance, the hole where the locking pin is inserted to keep the end cap secure can be used to receive the push button of the first telescoping member. It is to be appreciated that the first telescoping member may be pulled out first. Generally, the telescoping members can be configured to extend out approximately half of their length. As can be appreciated, this can provide strength to the telescoping crossbar assemblies for supporting an awning while withstanding external forces applied to the awning. Less sag and damage to the components of the telescoping crossbar assemblies is another benefit to limiting a distance the telescoping members extend.

Of significant note, in contrast to currently available vehicular awnings, embodiments of the telescoping crossbar assemblies do not require vertical support members at a distal end of the telescoping crossbar assemblies. As can be appreciated, this can remove the footprint of the awning allowing for more space under the awning. Further, currently available awnings typically secure to the roof rack crossbars, thus taking up space on the crossbars where other accessories could be secured.

Currently available crossbars can include crossbars configured to be mounted transverse to a longitudinal axis of a vehicle and can be implemented to support loads placed thereupon. For instance, the crossbars can support a bicycle carrier, ski carrier, kayak carrier, and/or the like. Crossbars are typically mounted on a vehicle in pairs, such that a forward and an aft crossbar are secured to the vehicle for proper load distribution. Crossbars can have a variety of different cross-sections including, but not limited to, round, square, teardrop, aerodynamic, and/or any other suitable shape or combination of shapes. The crossbar assemblies can be implemented with a variety of different cross-sectional shapes similar to currently available crossbars.

Similar to currently available crossbars, a variety of different means of securing the telescoping crossbar assemblies to a vehicle are contemplated and can be implemented with the described telescoping crossbar assemblies. Further, currently available accessories for securing different objects to the cross-members can be implemented. For instance, a roof bike mount can be implemented with the disclosed telescoping crossbar assemblies. As can be appreciated, by allowing for accessories to be secured to the telescoping crossbar assemblies, the telescoping crossbar assemblies can replace currently available crossbars and include the additional functionality of having horizontally extending members that are supported by the vehicle roof rack. Typically, the housings can replace crossbars of a roof rack that are configured to be secured proximate a roof of the vehicle.

In a typical implementation, each of the telescoping crossbar assemblies can be configured into an extended position. After the telescoping crossbar assemblies are fully extended, a tarp (e.g., a canopy or other covering) can be secured to the telescoping members of the telescoping crossbar assemblies to form an awning.

The telescoping roof rack system can operate substantially similar to currently available roof rack crossbars and can include telescoping members for providing a horizontal support for an awning or other similar objects. The disclosed telescoping crossbar assemblies can be secured to a roof rack and be implemented to support various roof rack accessories including, but not limited to, bike mounts, kayak mounts, ski racks, storage containers, etc. Typically, the telescoping members of the telescoping crossbar assembly can be spring loaded to provide easy access to the telescoping members and also minimize movement and vibration when in a stored configuration.

In one embodiment, a crossbar assembly can include, but is not limited to, a housing and a telescoping assembly integrated into the housing. The housing can be adapted to be (i) secured to a vehicle roof rack and (ii) load bearing. The telescoping assembly can include, but is not limited to, a first spring, a first stop, a first telescoping member, a second spring, a second stop, and a second telescoping member. The first spring can have a first end interfacing with a closed end of the housing. The first stop can interface with a second end of the first spring. The first telescoping member can interface with the first stop. The second spring can have a first end interfacing with the first stop. The second stop can interface with a second end of the second spring. The second telescoping member can interface with the second stop. In a first configuration, the telescoping assembly can be located substantially within the housing and under compression. In a second configuration, the telescoping assembly can be extended and a canopy can be removably coupled to the telescoping assembly.

In one embodiment, a vehicle awning assembly can include, but is not limited to, a canopy and a pair of crossbar assemblies. Each one of the pair of crossbar assemblies can include a housing and a telescoping assembly integrated into the housing. The housing can be adapted to be (i) secured to a vehicle roof rack and (ii) load bearing. In a first configuration, the telescoping assemblies can each be located substantially within the housings. In a second configuration, each of the telescoping assemblies can be extended out of the housings and the canopy can be removably coupled to each of the telescoping assemblies.

In one embodiment, a vehicle canopy kit can include, but is not limited to, a canopy, a first telescoping crossbar, and a second telescoping crossbar. The first telescoping crossbar and the second telescoping crossbar can each be attached to a vehicle roof rack. The first telescoping crossbar and the second telescoping crossbar can each include, but are not limited to, a housing and a telescoping assembly integrated into the housing. The telescoping assembly can include, but is not limited to, a first spring, a first stop, a first telescoping member, a second spring, a second stop, and a second telescoping member. The first spring can have a first end interfacing with a closed end of the housing. The first stop can interface with a second end of the first spring. The first telescoping member can interface with the first stop. The second spring can have a first end interfacing with the first stop. The second stop can interface with a second end of the second spring. The second telescoping member can interface with the second stop.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Crossbar Assembly

Referring to FIGS. 1A-1C, detailed diagram of an embodiment 100 of a crossbar assembly are illustrated. In one instance, two or more of the crossbar assemblies 100 can be implemented to provide a means for securing an awning proximate a vehicle rooftop. Of note, the crossbar assembly 100 can be load bearing and can be implemented similar to currently available crossbars. Typically, the crossbar assembly 100 can be implemented in pairs. FIG. 1A includes an exploded side view of the crossbar assembly 100. FIG. 1B includes a side view of the crossbar assembly 100 in an extended configuration. FIG. 1C includes a side view of the crossbar assembly 100 in a retracted configuration.

As shown generally, the crossbar assembly 100 can include, but is not limited to, a housing 102 and a telescoping assembly 104. The telescoping assembly 104 can be sized to fit inside the housing 102. In a first configuration, as shown in FIG. 1B, the telescoping assembly 104 can be extended and protrude out an end of the housing 102. In a second configuration, as shown in FIG. 1C, the telescoping assembly 104 can be retracted inside the housing 102. Of note, a single telescoping assembly 104 is generally shown in the crossbar assembly 100. Embodiments are contemplated where the crossbar assembly 100 includes a pair of telescoping assemblies 104 configured to extend out in opposite directions of the housing 102.

The housing 102 can be configured to be mounted to a roof rack on a vehicle. Typically, the housing 102 can be manufactured from a rigid material. For example, steel, aluminum, carbon fiber, etc. can be implemented to manufacture the housing 102. Different known means for attaching crossbars to a roof rack can be implemented with the housing 102. Generally, the housing 102 can be mounted transverse to a longitudinal axis of a vehicle. The housing 102 can typically have an aerodynamic profile. However, other profiles are contemplated. For example, the housing 102 may have a substantially circular cross-section or a square cross-section. In one example, the housing 102 can have an aerofoil cross-section. The housing 102 can include an end stop 103 adapted to keep components of the telescoping assembly 104 inside the housing 102. In one instance, the end stop 103 can be a cap removably coupled to the housing 103. For example, the cap can be threadably coupled to the housing 102. In another instance, a cotter pin can be implemented to keep the telescoping assembly 104 inside the housing 102.

In some instances, the telescoping assembly 104 can be integrated into the housing 102. In other instances, components of the telescoping assembly 104 may be removable from the housing 102.

In one embodiment, the telescoping assembly 104 can include, but is not limited to, a first spring 106, a first stop 108, a first telescoping member 110, a second spring 112, a second stop 114, and a second telescoping member 116. Embodiments are contemplated where a third spring, a third stop, and a third telescoping member can be implemented. Generally, a first end of the housing 102 can be closed and a second end can be open to receive components of the telescoping assembly 104 therein. The first spring 106 and the first stop 108 can be inserted into the open end of the housing 102 before the first telescoping member 110 is inserted. The second spring 112, the second stop 114, and the second telescoping member 116 may then each be inserted into the first telescoping member 110. Of note, the first telescoping member 110 can be sized to move in and out of the housing 102. Similarly, the second telescoping member 116 can be sized to move in and out of the first telescoping member 110. As can be appreciated, the second spring 112 can be located between the first stop 108 and the second stop 114 and the second telescoping member 116 can interface with the second stop 114.

In embodiments implementing a third telescoping member, a third stop, a third spring, and the third telescoping member can be inserted into the second telescoping member. The third spring can be located between the second stop and the third stop. The third telescoping member can interface with the third stop. Of note, the first stop, the second stop, and the third stop may be integrally formed as part of the springs. In another instance, the telescoping members can be adapted to interface directly with the springs such that the springs do not pass through at least one end of the telescoping members.

In some embodiments, the housing 102 and the first telescoping member 110 can each include holes 118 adapted to receive a protrusion therein. Of note, although a single hole is shown in the housing 102 and the first telescoping member 110, embodiments are contemplated where each can include two or more holes. As can be appreciated, by providing more holes, a user can determine how far out they would like the telescoping assembly 104 to protrude from a side of a vehicle. The first telescoping member 110 and the second telescoping member 116 can each include retractable protrusions 120 for interfacing with the holes 118. For instance, the retractable protrusions 120 can be spring button clips. The holes 118 and the retractable protrusions 120 can be implemented to lock the telescoping assembly 104 in an extended configuration. Generally, as the first telescoping member 110 is pulled out from the housing 102, the retractable protrusion 120 can be in a retracted position and can extend out when passing the hole 118 in the housing 102. Similarly, as the second telescoping member 116 is pulled out of the first telescoping member 110, the retractable protrusion 120 in the second telescoping member 116 can be in a retracted position until passing the hole 120 in the first telescoping member 110. It is to be appreciated that other means of locking the components of the telescoping assembly 104 in an extended configuration are contemplated and not outside a scope of the present disclosure.

To fully insert the first telescoping member 110 and the second telescoping member 116 into the housing 102, the springs 106, 112 need to be compressed. After the telescoping members 110, 116 have been inserted fully into the housing 102, the end stop 103 can be secured to the open end of the housing 102 to keep the components of the telescoping assembly 104 inside the housing 102. Of note, by compressing the springs 106, 112 when inserting the telescoping members 110, 116, the springs 106, 112 can constantly push the telescoping members 110, 116 and thus limit an amount of movement of the telescoping members 110, 116 when stored for traveling.

In a typical implementation, the end stop 103 can be secured to an open end of the housing 102. When a user is ready to move their vehicle, the components of the telescoping assembly 104 can be inserted into the housing 102 and the end stop 103 can be secured to the housing 102. Of note, any accessory attached to the crossbar assembly 100 will not need to be moved or adjusted to deploy the telescoping assemblies 104 of the crossbar assembly 100. In one example embodiment, a cotter pin and rod combination can be used to secure the end stop 103 to the housing 102. It is to be appreciated that other means of securing the end stop 103 to the housing 102 are contemplated. In one embodiment, the end stop 103 may be friction fit to the open end of the housing 102. In another embodiment, the end stop 103 may be threadably coupled to the open end of the housing 102.

Referring to FIG. 2, an example embodiment of a pair of telescoping crossbar assemblies 100 attached to a vehicle 150 is shown. An accessory 155 is illustrated secured to the assemblies 100. The accessory 155 can be a cargo box adapted to be secured to the crossbar assemblies 100 on the vehicle 150. The pair of telescoping crossbar assemblies 100 can be secured to the vehicle 150 via crossbar connectors 160. Depending on the type of shape (or profile) of the housings 102, an appropriate crossbar connector 160 (e.g., a tower or foot) can be implemented. For instance, where an aerofoil profile may be implemented, a tower configured to securely couple to the crossbar assembly 100 and a vehicle can be implemented. A variety of different crossbar connectors 160 are known and can be implemented with the telescoping crossbar assemblies 100 based on a profile of the housings 102. As can be seen, the cargo box 155 can cover a significant portion of the housings 102 such that another accessory would likely not fit on the crossbar assemblies 100. Of significant note, the telescoping assemblies 104 do not take up any space on an exterior of the housing 102, and thus do not limit an amount of usable space on the crossbar assemblies 100. FIG. 2 further shows each of the crossbar assemblies 100 including a pair of telescoping assemblies 104 configured to extend out of either end of the housings 102.

Figure 3:
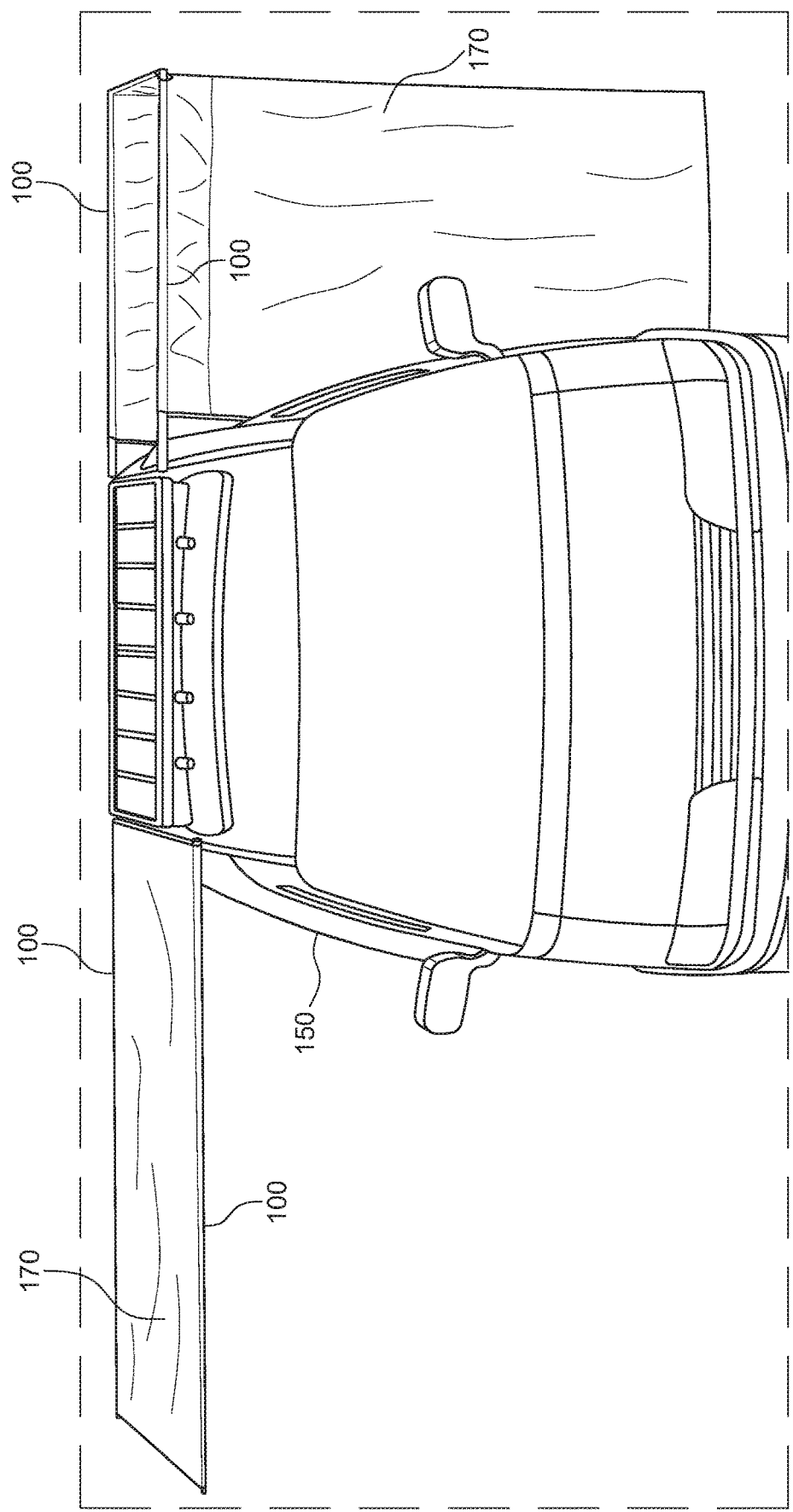
FIG. 3 is a front perspective view of accessories attached to a pair of crossbar assemblies on a vehicle according to one embodiment of the present invention.

Referring to FIG. 3, a plurality of telescoping crossbar assemblies 100 are shown attached to a vehicle 150 with a canopy 170 and a shower curtain 180 secured to the telescoping crossbar assemblies 100. Embodiments are contemplated where more than two crossbar assemblies 100 can be implemented on a vehicle. In such an embodiment where the crossbar assemblies house a single telescoping assembly 104, four crossbar assemblies can be implemented to provide protrusions extending out on either side of the vehicle. As previously mentioned, in some embodiments, the crossbar assemblies 100 may include two telescoping assemblies 104 that extend out either side of the crossbar assembly 100.

An Embodiment of a Vehicle Awning Kit

Figure 4:
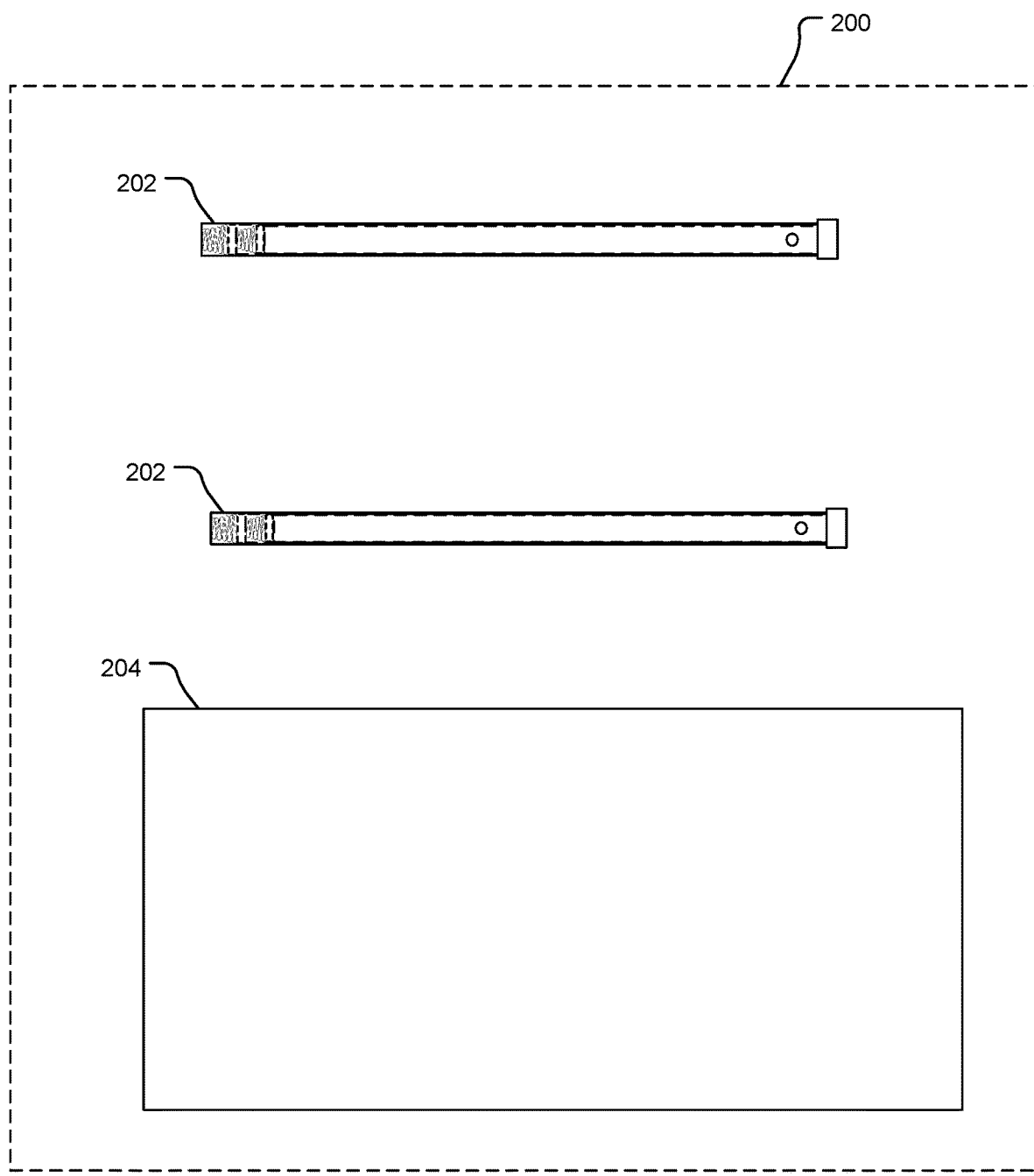
FIG. 4 is a view of a vehicle awning kit according to one embodiment of the present invention.

Referring to FIG. 4, a detailed diagram of an embodiment 200 of a vehicle awning kit is illustrated. The vehicle awning kit 200 can be implemented to provide an awning for a vehicle that does not require attachment to crossbars of a roof rack taking up space on the crossbars.

As shown, the vehicle awning kit 200 can include a pair of crossbar assemblies 202 and a canopy 204. The canopy 204 can be configured to removably couple to the pair of crossbar assemblies 202. In one instance, the canopy 204 can include pockets for receiving a portion of the crossbar assemblies 202 therein. In another instance, the canopy 204 can include mechanical fasteners adapted to removably couple to the crossbar assemblies 202. It is to be appreciated that a variety of different means for securing the canopy 204 to the crossbar assemblies 202 are contemplated and not outside a scope of the present invention.

The pair of crossbar assemblies 202 can each be substantially similar to the previously described crossbar assemblies 100. For instance, the crossbar assemblies 202 can each include a housing and a telescoping assembly. The housing can include an end stop and a means for being secured to a roof rack. For example, roof rack towers can be implemented to couple the crossbar assemblies 202 to a vehicle roof rack. The telescoping assembly can include, but is not limited to, a first spring, a first stop, a first telescoping member, a second stop, a second spring, and a second telescoping member. Embodiments can further include a third spring, a third stop, and a third telescoping member.

In a typical implementation, the crossbar assemblies 202 can first be attached to a vehicle roof rack. Depending on a profile of the crossbar assemblies 202 and a roof rack system on the vehicle, appropriate roof rack connecters can be selected to couple the crossbar assemblies 202 to the vehicle roof rack. Generally, the canopy 204 can be stored in an interior of the vehicle while not in use. Embodiments are contemplated where a container or some other bag can be included to store the canopy 204 while not in use. In one instance, one of the crossbar assemblies 202 can include an attached bag for storing the canopy 204. The attached bag may be coupled to an underside of one of the crossbar assemblies 202.

After the crossbar assemblies 202 have been attached to the vehicle, the vehicle awning kit 200 can be ready for use. Typically, after a user has arrived at a location where the vehicle will be parked for some time, the user can deploy the telescoping assemblies of the crossbar assemblies 202. Once the telescoping assemblies are fully deployed, the user can then removably secure the canopy 204 to the extended telescoping assemblies to provide an awning proximate a side of the vehicle.

When the user is ready to move the vehicle, the user can remove the canopy 204 from the extended telescoping assemblies. Next, the user can retract the telescoping assemblies into the housings of the crossbar assemblies 202 and attach the end stops. Of significant note, the vehicle awning kit 200 can be implemented to provide an awning for a vehicle without taking up any space on crossbars.

An Embodiment of a Telescoping Roof Rack System

Referring to FIGS. 5A-6C, detailed diagrams of an embodiment 300 of a telescoping roof rack system are illustrated. The telescoping roof rack system 300 can be implemented to provide protruding members in front, back, and to both sides of a vehicle 350. The telescoping roof rack system 300 can implement telescoping assemblies substantially similar to the first embodiment telescoping assemblies 104.

Figure 5A:
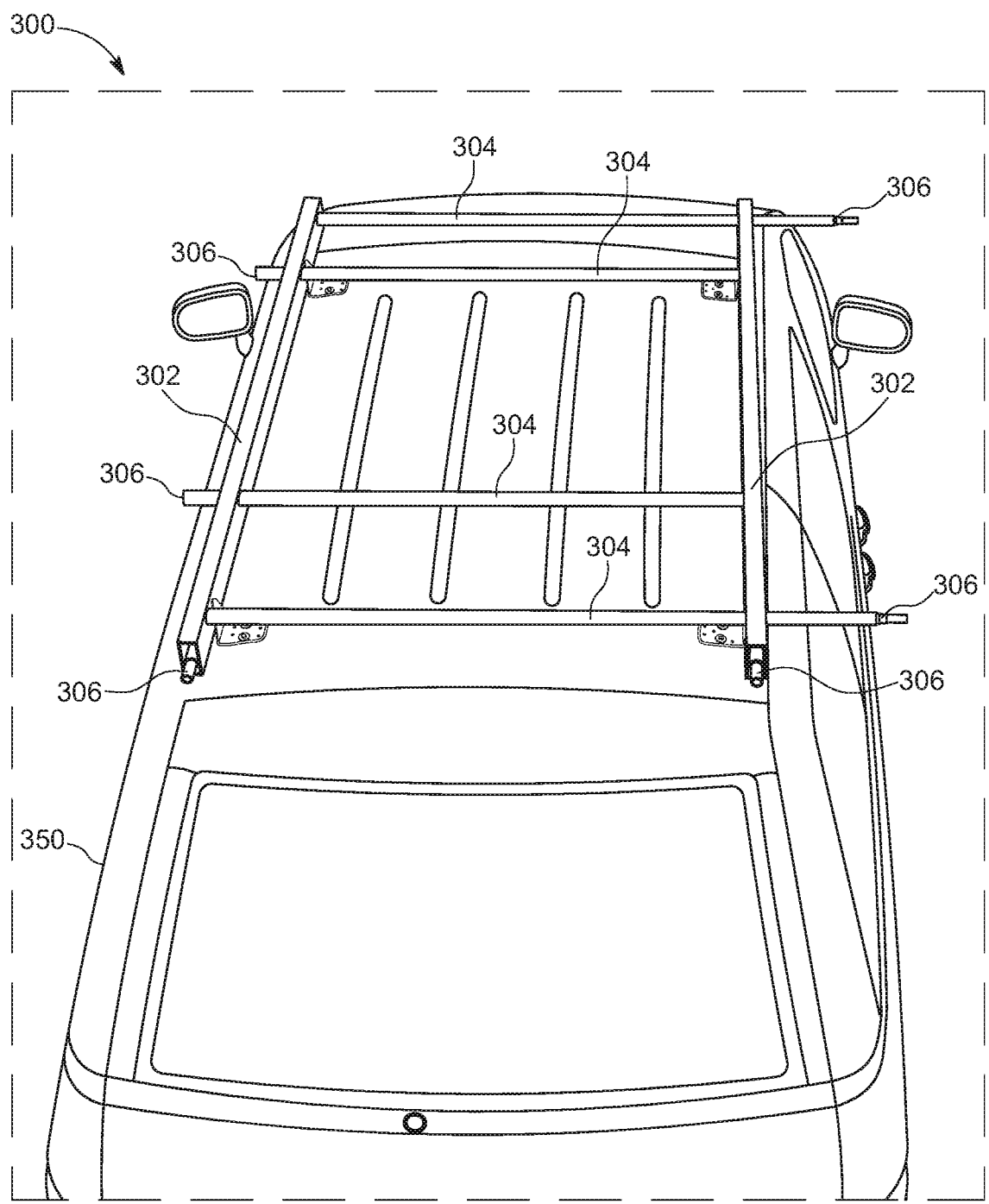
FIG. 5A is a back perspective view of a telescoping roof rack system in a retracted configuration according to one embodiment of the present invention.
Figure 5B:
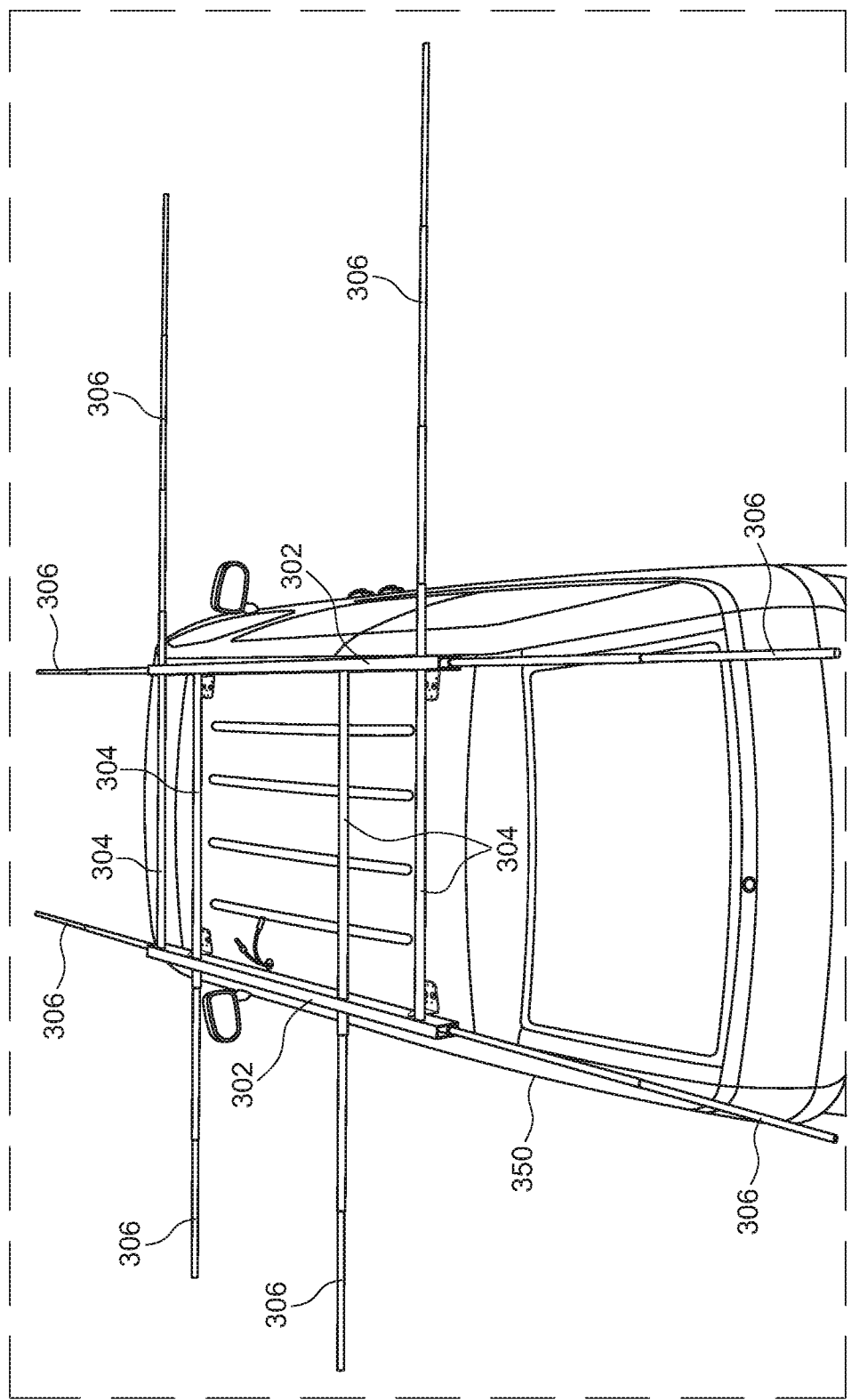
FIG. 5B is a back perspective view of a telescoping roof rack system in an extended configuration according to one embodiment of the present invention.

As generally shown in FIGS. 5A-5B, the telescoping roof rack system 300 can include, but is not limited to, a pair of roof rack assemblies 302 and a plurality of crossbar assemblies 304. Typically, the pair of roof rack assemblies 302 can be secured to a roof of a vehicle parallel to a longitudinal axis of the vehicle. The plurality of crossbar assemblies 304 can be oriented perpendicular to the longitudinal axis of the vehicle.

The plurality of crossbar assemblies 304 can be secured to the pair of roof rack assemblies 302. In one instance, the plurality of crossbar assemblies 304 can be coupled directly to the pair of roof rack assemblies 302. For example, a first end of a crossbar assembly can be partially inserted into a first roof rack assembly, and then another end of the crossbar assembly can be passed through a second roof rack assembly, as generally shown in FIGS. 5A-5B. In another instance, currently known connectors can be implemented to couple the crossbar assemblies 304 to the pair of roof rack assemblies 302.

Referring generally to FIGS. 6A-6C, a side view of one of the roof rack assemblies 302, a side view of one of the plurality of crossbar assemblies 304, and a crossbar assembly 304 in an extended configuration are illustrated, respectively.

In one embodiment, the pair of roof rack assemblies 302 can each include a pair of telescoping assemblies 306 and each of the plurality of crossbar assemblies 304 can include a telescoping assembly 306. Generally, the telescoping assemblies 306 of each one of the telescoping roof rack assemblies 302 can be configured to extend in opposite directions. As can be appreciated, the telescoping assemblies 306 can extend in front of and in back of the vehicle, as shown in FIG. 5B.

Figure 6D:
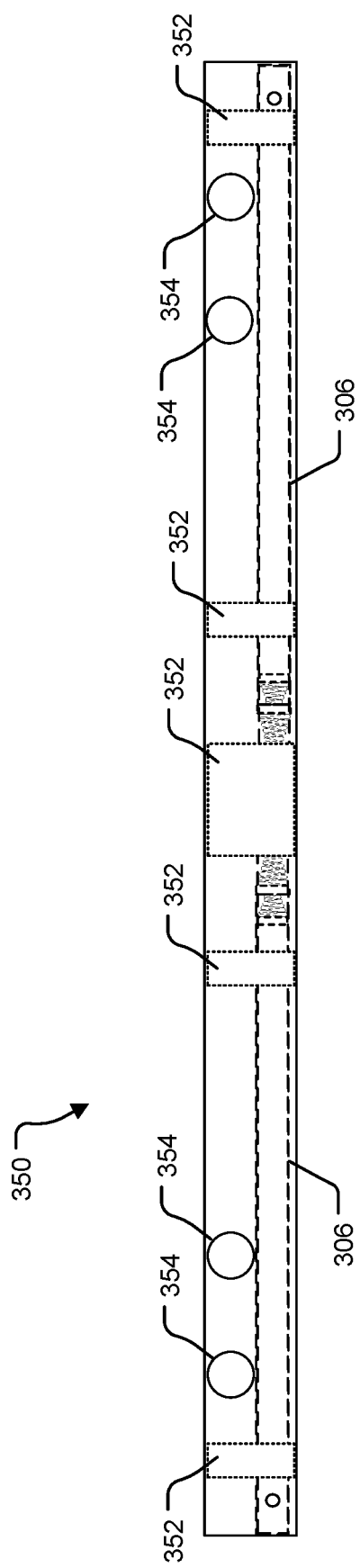
FIG. 6D is a side view of a roof rack assembly according to one embodiment of the present invention.

As shown in FIG. 6C, the telescoping assemblies 306 can include, but are not limited to, a housing 308, a first spring 310, a first stop 312, a first telescoping member 314, a second spring 316, a second stop 318, and a second telescoping member 320. The telescoping assembly 306 can include an end stop 309 (shown in FIG. 6B) to secure the components of the telescoping assembly 306 inside the housing 308. As can be appreciated, the housings 308 of the roof rack assemblies 302 can be different from the housings 308 of the crossbar assemblies 304. The housings of the crossbar assemblies 304 can be configured to couple to the housings of the roof rack assemblies 302. In some embodiments, the housings 308 of the roof rack assemblies 302 can include a guide (or mounting mechanism) located internally in the housing 308 for securing the telescoping assembly 306 inside the housing 308 (see FIG. 6D). For instance, a block of material fixed inside the housing 308 can configured to receive and secure the telescoping assembly 308 can be implemented.

Referring back to FIGS. 5A-5B, the telescoping roof rack system 300 is illustrated in a retracted configuration (FIG. 5A) and an extended configuration (FIG. 5B). Of note, a pair of telescoping assemblies 306 are shown partially extended out one side of the vehicle 350 and another pair of telescoping assemblies 306 are shown partially extended out a back of the vehicle 350 in FIG. 5A. The partial extension of the components can be attributed to the springs not being compressed and partially pushing the components out of the housing. Of note, the components will need to be pushed in and the springs compressed before the end stop 309 can be secured to the end of the housing 308.

When ready for moving, the telescoping assemblies 306 would be fully inserted into the appropriate housings and the end stops 309 would be attached to secure the telescoping assemblies 306 therein. As shown in FIG. 5B, in the extended configuration, each of the telescoping assemblies 306 can be extended out. Of note, the telescoping roof rack system 300 provides the vehicle 350 protrusions (e.g., the telescoping assemblies 306) extending out in front, back, and to each side of the vehicle 350. In such an embodiment, the telescoping roof rack assembly 300 can include 4 crossbar assemblies 304. The crossbar assemblies 304 can be configured so that pairs of assemblies 304 extend out in the same direction. Typically, the two pairs can extend out in opposite directions. As shown in FIG. 3, an awning can be attached to one side of the vehicle 350 and a shower curtain can be attached to the other side. Alternatively, the awning and the shower curtain could be attached to either the front or back of the vehicle 350.

Referring to FIG. 6D, a side view of one example embodiment of a roof rack assembly 350 is illustrated. The roof rack assembly 350 can be implemented similarly to the previously described roof rack assembly 302. The roof rack assembly 350 can include a pair of telescoping assemblies 306 configured to extend out opposite ends of the roof rack assembly 350. As shown, the roof rack assembly 350 can implement a plurality of mounting mechanisms 352 to locate and secure the telescoping assemblies 306 inside the roof rack assembly 350. As shown, where a housing of the telescoping assemblies 306 is adapted to directly couple to crossbar assemblies, the mounting mechanisms 352 can locate the telescoping assemblies 306 in a lower portion of the housing such that crossbar assemblies can be received in holes 354 configured to receive the crossbar assemblies. A centrally located mounting mechanism 352 can be implemented as a stop for the springs of the pair of telescoping assemblies 306.

Alternative Embodiments and Variations

Embodiments are contemplated where the described telescoping crossbar assemblies can be implemented in other situations. For instance, embodiments are contemplated where a substantially similar device can be secured in the side of a building or home. The device can operate in a similar way allowing for a horizontal support member to extend out from the side of the building or home to provide an awning. As can be appreciated, when not needed, the awning cover can be removed and the telescoping members can be retracted into the main housing which may be located inside the building or home.

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A crossbar assembly comprising:
a housing adapted to be (i) secured to a vehicle roof rack and (ii) load bearing; and
a telescoping assembly integrated into the housing;
a first configuration where the telescoping assembly is located substantially within the housing and under compression; and
a second configuration where the telescoping assembly is extended and a canopy is removably coupled to the telescoping assembly.

2. The crossbar assembly of claim 1, wherein the telescoping assembly includes:
a first spring having a first end interfacing with a closed end of the housing;
a first stop interfacing with a second end of the first spring;
a first telescoping member interfacing with the first stop;
a second spring having a first end interfacing with the first stop;
a second stop interfacing with a second end of the second spring; and
a second telescoping member interfacing with the second stop.

3. The crossbar assembly of claim 2, wherein in the first configuration the first spring and the second spring are compressed.

4. The crossbar assembly of claim 2, wherein in the second configuration (i) the first telescoping member is extended at least half-way out of the housing, and (ii) the second telescoping member is extended at least half-way out of the first telescoping member.

5. The crossbar assembly of claim 2, wherein the housing and the first telescoping member each include a hole adapted to receive a protrusion therein.

6. The crossbar assembly of claim 5, wherein the first telescoping member and the second telescoping member each include a retractable protrusion for interfacing with one of the holes.

7. The crossbar assembly of claim 1, wherein the housing further includes an end stop adapted to removably couple to an open end of the housing.

8. The crossbar assembly of claim 7, wherein the end stop is coupled to the housing in the first configuration and is uncoupled from the housing in the second configuration.

9. The crossbar assembly of claim 8 in combination with a second crossbar assembly and a canopy.

10. A vehicle awning assembly comprising:
 a canopy; and
 a pair of crossbar assemblies, each one of the pair of crossbar assemblies including:
  a housing adapted to be (i) secured to a vehicle roof rack and (ii) load bearing; and
  a telescoping assembly integrated into the housing;
 a first configuration where the telescoping assemblies are each located substantially within the housings and under compression; and
 a second configuration where each of the telescoping assemblies are extended out of the housings and the canopy is removably coupled to each of the telescoping assemblies.

11. The vehicle awning assembly of claim 10, wherein each of the telescoping assemblies include:
 a first spring having a first end interfacing with a closed end of the housing;
 a first stop interfacing with a second end of the first spring;
 a first telescoping member interfacing with the first stop;
 a second spring having a first end interfacing with the first stop;
 a second stop interfacing with a second end of the second spring; and
 a second telescoping member interfacing with the second stop.

12. The vehicle awning assembly of claim 11, wherein in the first configuration the first springs and the second springs are each compressed.

13. The vehicle awning assembly of claim 11, wherein in the second configuration (i) the first telescoping members are each extended at least half-way out of the housings, and (ii) the second telescoping members are extended at least half-way out of the first telescoping members.

14. The vehicle awning assembly of claim 10, wherein the telescoping assemblies extend out transverse to a longitudinal axis of the vehicle in parallel to one another.

15. The vehicle awning assembly of claim 10, wherein the housings are adapted to receive one or more accessories thereon when secured to the roof rack.

16. The vehicle awning assembly of claim 10, wherein a full length of the housings is available to receive an accessory thereon.

17. The vehicle awning assembly of claim 10, wherein the housings each have a substantially aerodynamic cross-sectional shape.

18. The vehicle awning assembly of claim 17, wherein the substantially aerodynamic cross-sectional shape is an aerofoil shape.

19. The vehicle awning assembly of claim 10, wherein an accessory is coupled to each of the housings proximate an end of the housings when in the second configuration.

20. A vehicle awning kit comprising:
 a canopy;
 a first telescoping crossbar adapted to attach to a vehicle roof rack; and
 a second telescoping crossbar adapted to attach to the vehicle roof rack;
 wherein the first telescoping crossbar and the second telescoping crossbar each include:
  a housing; and
  a telescoping assembly integrated into the housing, the telescoping assembly comprising:
   a first spring having a first end interfacing with a closed end of the housing;
   a first stop interfacing with a second end of the first spring;
   a first telescoping member interfacing with the first stop;
   a second spring having a first end interfacing with the first stop;
   a second stop interfacing with a second end of the second spring; and
   a second telescoping member interfacing with the second stop;
  wherein in a travel configuration the telescoping assembly is located substantially within the housing and under compression.

* * * * *